United States Patent
Bartley et al.

(10) Patent No.: US 7,163,668 B2
(45) Date of Patent: Jan. 16, 2007

(54) HYDROGEN SELECTIVE CATALYTIC REDUCTION FOR $NO_x$

(75) Inventors: Gordon James Johnston Bartley, San Antonio, TX (US); Christopher Alan Sharp, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 123 days.

(21) Appl. No.: 10/788,508

(22) Filed: Feb. 27, 2004

(65) Prior Publication Data

US 2004/0170548 A1 Sep. 2, 2004

Related U.S. Application Data

(62) Division of application No. 10/093,199, filed on Mar. 7, 2002.

(51) Int. Cl.
*B01D 53/56* (2006.01)
(52) U.S. Cl. .................................. 423/239.1
(58) Field of Classification Search ............... 423/212, 423/213.2, 213.5, 239.1
See application file for complete search history.

(56) References Cited

U.S. PATENT DOCUMENTS

| | | | |
|---|---|---|---|
| 4,902,487 A | 2/1990 | Cooper et al. | 423/215.5 |
| 5,441,401 A | 8/1995 | Yamaguro et al. | 431/4 |
| 5,543,124 A | 8/1996 | Yokota et al. | 423/239.1 |
| 5,791,139 A | 8/1998 | Atago et al. | 60/274 |
| 6,122,909 A | 9/2000 | Murphy et al. | 60/286 |
| 6,145,501 A | 11/2000 | Manohar et al. | 126/110 |
| 6,182,443 B1 | 2/2001 | Jarvis et al. | 60/274 |
| 6,653,005 B1 * | 11/2003 | Muradov | 429/19 |

FOREIGN PATENT DOCUMENTS

EP 0537968 A1 * 4/1993

OTHER PUBLICATIONS

Japanese Pending Patent Application entitled "Device for Measuring Amount of Hydrogen in Exhaust Gas and Exhaust Gas Emission Control System", by Hitoshi, et al.; Publication No. 2001-304031; English Abstract, filed Apr. 19, 2000.

* cited by examiner

*Primary Examiner*—Edward M. Johnson
(74) *Attorney, Agent, or Firm*—Baker Botts L.L.P.

(57) ABSTRACT

An emission control system for reducing $NO_x$ in the exhaust of a diesel engine. A partial oxidation system receives diesel fuel from the engine's fuel tank and partially oxidizes the diesel fuel into hydrogen. The hydrogen is then introduced into the main exhaust line and the hydrogen-enhanced exhaust is delivered to a hydrogen selective catalytic reduction unit, which uses the hydrogen to convert the $NO_x$ to nitrogen.

14 Claims, 1 Drawing Sheet

HYDROGEN SELECTIVE CATALYTIC REDUCTION FOR $NO_x$

RELATED PATENT APPLICATION

This application is a divisional of U.S. patent application Ser. No. 10/093,199, filed Mar. 7, 2002, and entitled "$NO_x$ Reduction System for Diesel Engines, Using Hydrogen Selective Catalytic Reduction."

TECHNICAL FIELD OF THE INVENTION

This invention relates to emission reduction systems for diesel engines, and more particularly to nitrogen oxide reduction using a hydrogen-selective catalytic reduction catalyst.

BACKGROUND OF THE INVENTION

In an effort to reduce ambient levels of air pollution in the United States, the United States Environmental Protection Agency (EPA) has proposed a tightening of the emissions standards for heavy-duty diesel engines. This proposal includes measures for reducing the allowable sulfur content of diesel fuel. The proposal aims to lower emissions by about 95 percent, with nitrogen oxides ($NO_x$) and particulate matter (PM) emission standards of 0.2 and 0.01 gram per brake horsepower hour, respectively.

Existing aftertreatment technologies for achieving these goals include both PM reduction systems and NOx reduction systems. For PM reduction, existing technologies include a continuously regenerating trap (CRT®) and catalyzed traps. The term "CRT®" refers specifically to the particulate filter manufactured by Johnson Matthey of London, United Kingdom, described in U.S. Pat. No. 4,902,487. For NOx reduction, existing technologies include selective catalytic reduction (SCR) systems that use urea as the reductant, and NOx storage catalysts.

Various factors determine which aftertreatment technology is most suitable for diesel engine exhaust. One consideration is the effect of the sulfur content in the diesel fuel. Sulfur increases the regenerating temperature of a CRT, which adversely affects its performance. Sulfur is also a poison for NOx traps. Because of the negative effects of sulfur on aftertreatment performance, the EPA is recommending a diesel fuel sulfur cap of 15 ppm.

However, evidence implies that 15 ppm may still be too high for NOx traps to be effective. As a result, urea SCR systems may be a more effective method for adequate NOx reduction.

Despite their effectiveness, urea SCR systems are not without their shortcomings. Urea SCR is based on ammonia reduction, with urea being the reductant of choice for vehicular applications, due to the perception that a supply of ammonia on-board a vehicle would be unsafe. Ammonia is considered to be highly toxic, whereas urea is only mildly toxic. But the problem with urea SCR is that a separate supply of urea is required on-board. Not only does this requirement call for a separate storage tank, but the urea must be replenished periodically and there is no infrastructure to provide a nationwide supply. Also, the system required to introduce urea into the exhaust stream is complex. In sum, there are many issues affecting the practicality of using urea for SCR.

DETAILED DESCRIPTION OF THE INVENTION

The invention described herein is directed to an SCR system that does not require urea as the reductant. The system uses diesel fuel instead of urea, which eliminates the requirement for a second supply tank and the need for a urea supply infrastructure.

Figure 1:
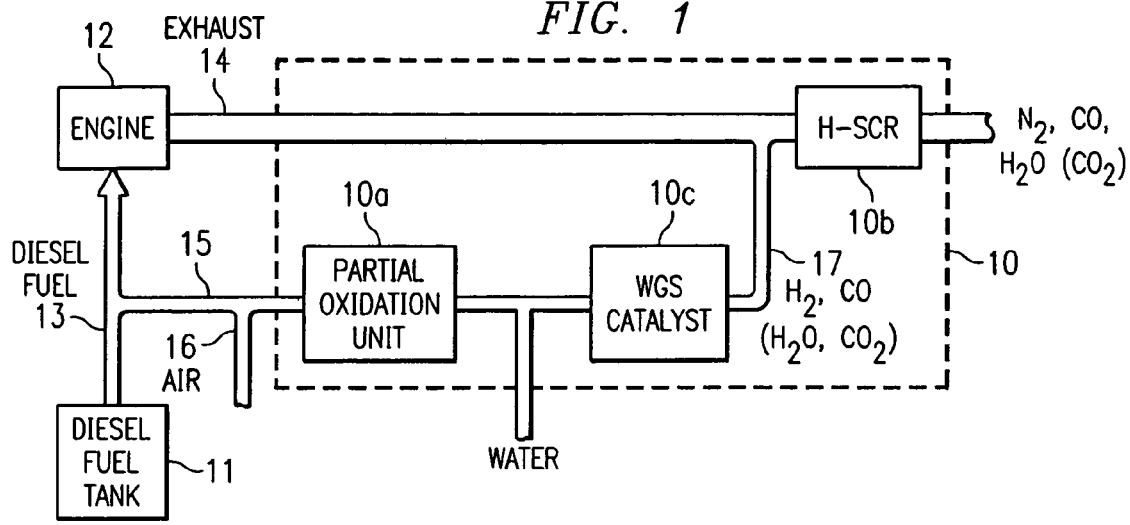
FIG. 1 is a block diagram of a first embodiment of the invention.
Figure 2:
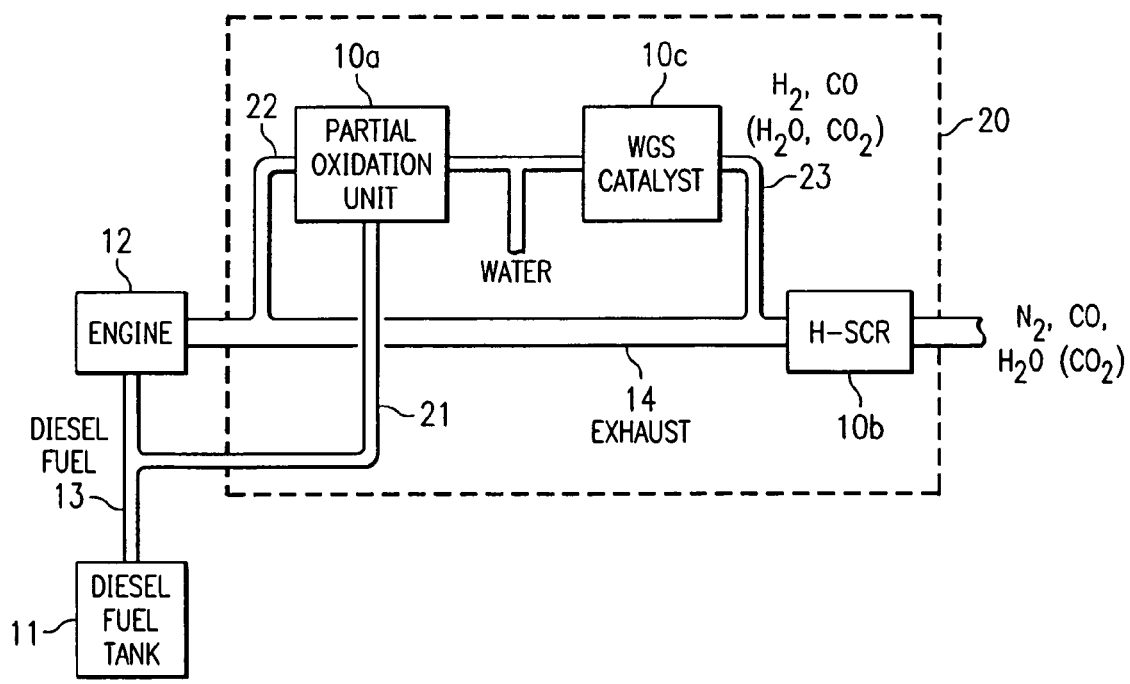
FIG. 2 is a block diagram of a second embodiment of the invention.

FIGS. 1 and 2 describe two different embodiments of the invention. Both use an oxidation unit 10a and a hydrogen selective catalytic reduction (H-SCR) unit 10b, but in different configurations. Both embodiments are used with diesel engines, which do not run rich. The oxidation unit 10a acts as a hydrogen generator, and runs "offline" of the main exhaust gas stream so that it may operate in a rich fuel environment. The hydrogen from oxidation unit 10a is fed to the H-SCR catalyst 10b, which continuously converts $NO_x$ to $N_2$ and $H_2O$. An optional water gas shift (WGS) catalyst 10c may be interposed between the partial oxidation unit 10a and the H-SCR catalyst 10b, to generate additional hydrogen.

As explained below, diesel fuel is partially oxidized by oxidation unit 10b to produce a combination of hydrogen ($H_2$) and carbon monoxide (CO), with traces of carbon dioxide ($CO_2$) and water ($H_2O$) produced as by products. The hydrogen is then used by an H-SCR catalyst 10b to convert the $NO_x$ in the exhaust stream into nitrogen. The H-SCR catalyst 10b is selected specifically to use hydrogen to reduce exhaust-borne $NO_x$ emissions, and operates under net oxidizing conditions (lambda>1).

FIG. 1 illustrates one embodiment of an H-SCR (hydrogen SCR) system 10 in accordance with the invention. Partial oxidation unit 10a receives a fraction of the diesel fuel, relative to the fuel flow to engine 12, from tank 11. Partial oxidation unit 10a may be any type of catalyst or non-stoichiometric burner, suitable for partial oxidation of hydrocarbons. In general, partial oxidation unit 10a operates by converting diesel fuel into a gas mixture containing hydrogen as one of its primary components. In the embodiment of FIG. 1, partial oxidation unit 10a receives diesel fuel from an auxiliary fuel line 15 off the main fuel line 13 and air from an air input line 16. An output line 17 delivers the gas mixture to the main exhaust line 14.

Partial oxidation catalysts exist that can convert hydrocarbons with conversion efficiency greater than 90 percent and selectivity to hydrogen in excess of 90 percent. Certain catalysts have already been proven effective at converting natural gas to hydrogen, namely nickel-based and rhodium-based formulations. These include $Ni/Al_2O_3$, $Ni/La/Al_2O_3$, and $Rh/Al_2O_3$. Although nickel-based catalysts may produce carbon, they are less expensive than rhodium-based catalysts.

Catalytic partial oxidation is a high space velocity process (e.g., 500,000 per hour), with residence times typically in the range of 10 to 1000 microseconds. Thus, the catalysts do not need to be large to have high efficiency and selectivity. Partial oxidation catalysts operate under reducing gas conditions, and the lambda in the partial oxidizer may be about 0.3 to 0.6.

In the embodiment of FIG. 1, an optional WGS catalyst 10c is interposed directly downstream of the partial oxidation unit 10a and upstream of H-SCR catalyst 10b. WGS catalyst 10c uses carbon monoxide (CO) generated by the partial oxidation unit 10a to form additional hydrogen. To enable this reaction, supplemental water may be added to the gas mixture entering WGS catalyst 10c. An advantage of using WGS catalyst 10c is that more hydrogen can be produced from the same amount of fuel. In other words, less fuel is needed to generate the same amount of hydrogen.

The gas mixture from WGS catalyst 10c is injected into the main diesel exhaust line 14, upstream of H-SCR catalyst 10b. In embodiments not having WGS catalyst 10c, the gas mixture from partial oxidation unit 10a would be injected into the main exhaust line 14 at the same point. In all embodiments, H-SCR catalyst 10b then uses the hydrogen in the gas mixture to convert $NO_x$ into nitrogen and water.

FIG. 2 illustrates a second embodiment of the invention, an H-SCR system 20, whose partial oxidation unit 10a is positioned on a branch line 22 off the main exhaust line. The partial oxidation unit 10a receives a portion of the exhaust diverted from the exhaust line, as well as diesel fuel from an auxiliary fuel line 21. Under net reducing conditions, diesel fuel is converted into hydrogen, carbon monoxide and traces of carbon dioxide and water. Like system 10, system 20 may have an optional WGS catalyst 10c downstream of the partial oxidation unit 10a. The hydrogen-enhanced gas mixture flows back into the main exhaust line, via an output branch line 23, upstream of an H-SCR catalyst 10b, which uses the hydrogen to convert $NO_x$ into nitrogen and water.

For system 20, effective partial oxidation is achieved by controlling the diesel injection rate. When no supplemental diesel fuel is being injected into the exhaust stream, such as when $NO_x$ emissions from engine 12 are low, the partial oxidation unit 10a acts as a full oxidation catalyst, converting unburned hydrocarbons and carbon monoxide into water and carbon dioxide. With the partial oxidation unit 10a located in a branch off the main exhaust gas stream, a portion of the exhaust flows through the partial oxidation catalyst. As a result, less diesel fuel is required to enrich the gas entering the partial oxidation catalyst. Also, the partial oxidation catalyst can be smaller. At the same time, sufficient hydrogen must be generated to obtain effective reduction of the $NO_x$ in the H-SCR catalyst 10b. This design has the advantages that the heat required to activate the partial oxidation catalyst may be provided by the exhaust gas instead of by an external heat source, and it may be possible to use the heat generated by the partial oxidation reaction to accelerate heating of the H-SCR catalyst 10b during cold-start operation.

For both system 10 and system 20, the products of partial oxidizer 10a are metered into the diesel exhaust gas, upstream of H-SCR catalyst 10b. The amount of gas injected should ideally be proportional to the amount of $NO_x$ in the exhaust. A 1:1 molar ratio of $H_2$:NO is expected for efficient conversion of NO to $N_2$ in accordance with Equation (1) below. However, $NO_2$ exists in the diesel exhaust simultaneously with NO, either from the combustion process (approximately 15 percent) or from oxidation in a passive particulate trap such as a CRT (approximately 40 percent). A 2:1 ratio of $H_2$:$NO_2$ is expected for efficient conversion of $NO_2$ to $N_2$ in accordance with Equation (2) below.

$$2NO + 2H_2 \text{---} > N_2 + 2H_2O \qquad \text{Equation (1):}$$

$$2NO_2 + 4H_2 \text{---} > N_2 + 4H_2O \qquad \text{Equation (2):}$$

Results of experimentation with ruthenium-based H-SCR catalysts using Ru/MgO and Ru/$Al_2O_3$ have been reported by Hornung, et al. in a paper entitled "On the mechanism of the selective catalytic reduction of NO to $N_2$ by $H_2$ over Ru/MgO and Ru/$Al_2O_3$ catalysts", in *Topics in Catalysis*, 2000, 11/12 (1–4), 263–70. The reports are of 100 percent selectivity to $N_2$. Another possible candidate for H-SCR catalyst 10b is a platinum titania-zirconia catalyst, Pt/$TiO_2$—$ZrO_2$.

Potential fuel penalties may be calculated based on the NO:$NO_2$ ratio in the exhaust. If a range of $NO_2$ content is considered from 15 to 100 percent, the fuel economy penalty is calculated to be in a range from two to four percent. To estimate a realistic fuel economy penalty, a worst case scenario was used with a system containing a passive PM trap, such as a CRT, which creates high levels of $NO_2$. Based on a 60:40 NO:$NO_2$ exhaust gas mixture, and using Equations (1) and (2), approximately 1.4 moles of $H_2$ are required per mole of $NO_x$. Assuming ideal conditions of 100 percent efficient partial oxidation, 100 percent selectivity to $H_2$, and 100 percent $NO_x$ conversion efficiency of the H—SCR catalyst, it was calculated that fuel economy would be reduced by 2.5 percent.

An advantage of the invention is that the invention effectively reduces tailpipe oxides of nitrogen emissions without the need for a reductant other than diesel fuel. It continuously converts $NO_x$ to nitrogen, by first generating hydrogen from the diesel fuel and then using the hydrogen in a hydrogen-based SCR catalyst. The system does not require adjustment of the engine air/fuel ratio, of engine combustion, or of any other engine functionality.

Other Embodiments

Although the present invention has been described in detail, it should be understood that various changes, substitutions, and alterations can be made hereto without departing from the spirit and scope of the invention as defined by the appended claims.

What is claimed is:

1. A method of treating the NOx emissions from a diesel engine having at least one internal combustion chamber for combusting diesel fuel, a main fuel line that carries diesel fuel to the engine, and a main exhaust line that carries exhaust from the engine, the exhaust having a range of exhaust gas temperatures typical for a vehicular diesel engine, the method comprising:

providing an auxiliary fuel line from the engine's diesel fuel supply source, separate from the main fuel line;

introducing air, via an air intake line, into the auxiliary fuel line, thereby mixing fuel in the auxiliary fuel line with air;

receiving the mixed portion of diesel fuel and air into a partial oxidation unit located external to the internal combustion chamber and off-line the main exhaust line;

wherein the partial oxidation unit has at least a heat generating means;

using the partial oxidation unit to receive air via the air intake line, to receive diesel fuel via the auxiliary fuel line, and to at least partially oxidize diesel fuel into a gas mixture containing hydrogen;

delivering the gas mixture to the main exhaust line;

placing a ruthenium-based hydrogen selective catalytic reduction (H-SCR) unit in-line on the main exhaust line, such that the H-SCR unit receives the exhaust and the gas mixture; and using the H-SCR unit to continuously convert NOx emissions to nitrogen;

wherein the H-SCR unit is further operable to reduce the NOx emissions to nitrogen during diesel operating temperatures under the range of exhaust gas temperatures;

determining the separate amounts of NO and NO2 in the exhaust; and metering the hydrogen delivered to the H-SCR unit to maintain a ratio of the hydrogen to NOx in the main exhaust line, on the basis of: desired ratio of hydrogen to NO, and a desired ratio of hydrogen to NO2.

2. The method of claim 1, wherein the partial oxidation unit is a non-stoichiometric burner.

3. The method of claim 1, wherein the partial oxidation unit has a catalyst.

4. The method of claim 3, wherein the partial oxidation unit is a nickel-based catalyst.

5. The method of claim 3, wherein the partial oxidation unit is a rhodium-based catalyst.

6. The method of claim 1, wherein the partial oxidation unit is a combination of a non-stoichiometric burner and a catalyst.

7. The method of claim 1, further comprising the step of using a water gas shift catalyst to receive the gas mixture from the partial oxidation unit and to generate additional hydrogen in the gas mixture.

8. A method of treating the NOx emissions from a diesel engine having at least one internal combustion chamber for combusting diesel fuel, a main fuel line that carries diesel fuel to the engine, and a main exhaust line that carries exhaust from the engine, the exhaust having a range of exhaust gas temperatures typical for a vehicular diesel engine, the method comprising:

providing an auxiliary fuel line from the engine's diesel fuel supply source, separate from the main fuel line;

receiving, via the auxiliary fuel line, a portion of diesel fuel from the main fuel line into a partial oxidation unit;

receiving, via an exhaust gas intake line, a portion of the exhaust from the main exhaust line into the partial oxidation unit;

wherein the partial oxidation unit is located external to the internal combustion chamber and off-line the main exhaust line;

using the partial oxidation unit to receive the portion of the exhaust via the exhaust gas intake line, to receive diesel fuel via the auxiliary fuel line, and to at least partially oxidize diesel fuel into a gas mixture containing hydrogen;

delivering the gas mixture to the main exhaust line;

placing a ruthenium-based hydrogen selective catalytic reduction (H-SCR) unit in line on the main exhaust line, such that the H-SCR unit receives the exhaust and the gas mixture, and;

using the H-SCR unit to continuously convert the NOx emissions into nitrogen;

wherein the H-SCR unit is further operable to reduce the NOx emissions to nitrogen during diesel operating temperatures under the range of exhaust gas temperatures;

determining the separate amounts of NO and NO2 in the exhaust; and metering the hydrogen delivered to the H-SCR unit to maintain a ratio of the hydrogen to NOx in the main exhaust line, on the basis of: desired ratio of hydrogen to NO, and a desired ratio of hydrogen to NO2.

9. The method of claim 8, wherein the partial oxidation unit is a non-stoichiometric burner.

10. The method of claim 8, wherein the partial oxidation unit has a catalyst.

11. The method of claim 10, wherein the partial oxidation unit is a nickel-based catalyst.

12. The method of claim 10, wherein the partial oxidation unit is a rhodium-based catalyst.

13. The method of claim 8, wherein the partial oxidation unit is a combination of a non-stoichiometric burner and a catalyst.

14. The method of claim 8, further comprising the step of using a water gas shift catalyst to receive the gas mixture from the partial oxidation unit and to generate additional hydrogen in the gas mixture.

* * * * *